April 6, 1954

E. H. WHITE 2,674,358

THERMOSTATICALLY ENGAGED CLUTCH

Original Filed Nov. 25, 1946

INVENTOR
EVERETT H. WHITE
BY
J. H. Braddock
ATTORNEY

April 6, 1954 E. H. WHITE 2,674,358
THERMOSTATICALLY ENGAGED CLUTCH
Original Filed Nov. 25, 1946 2 Sheets-Sheet 2

INVENTOR
EVERETT H. WHITE
BY
B. H. Braddock
ATTORNEY

Patented Apr. 6, 1954

2,674,358

UNITED STATES PATENT OFFICE 2,674,358

THERMOSTATICALLY ENGAGED CLUTCH

Everett H. White, St. Paul, Minn.

Original application November 25, 1946, Serial No. 712,059. Divided and this application February 20, 1950, Serial No. 145,265

9 Claims. (Cl. 192—82)

This application is a division of my pending application Serial No. 712,059, for an Air Conditioning System, filed November 25, 1946, and now Patent 2,509,948, granted May 30, 1950.

The invention herein has relation to a blower control through the instrumentality of which velocity and volume of air forced to and through a hood or plenum chamber of an air conditioning system can be progressively and accurately controlled and regulated through a range of values in response to the temperature in such hood or plenum chamber.

Objects of the invention are to provide a blower control which will include a multiple speed drive for a fan or blower of an air conditioning system adapted to cause air to be forced to and through a hood or plenum chamber of said air conditioning system and a novel and improved construction and arrangement whereby the velocity and volume of air forced to and through said hood or plenum chamber can be progressively and accurately controlled through a selected range of values, from zero to maximum as disclosed, by adjustment of said multiple speed drive in response to the temperature in such hood or plenum chamber, and also include a novel and improved construction and arrangement whereby said range of values selectively can be altered at will.

A further object is to provide in the blower control novel and improved mechanism through the instrumentality of which the speed of rotation of a fan or blower of an air conditioning system can be controllably altered in response to changes in temperature of a heat responsive element of said air conditioning system.

And a further object is to provide in the blower control various desirable and improved features and characteristics of construction which will be novel both as individual entities of said blower control and in combination with each other.

In the accompanying drawings forming a part of this specification,

Figure 1:
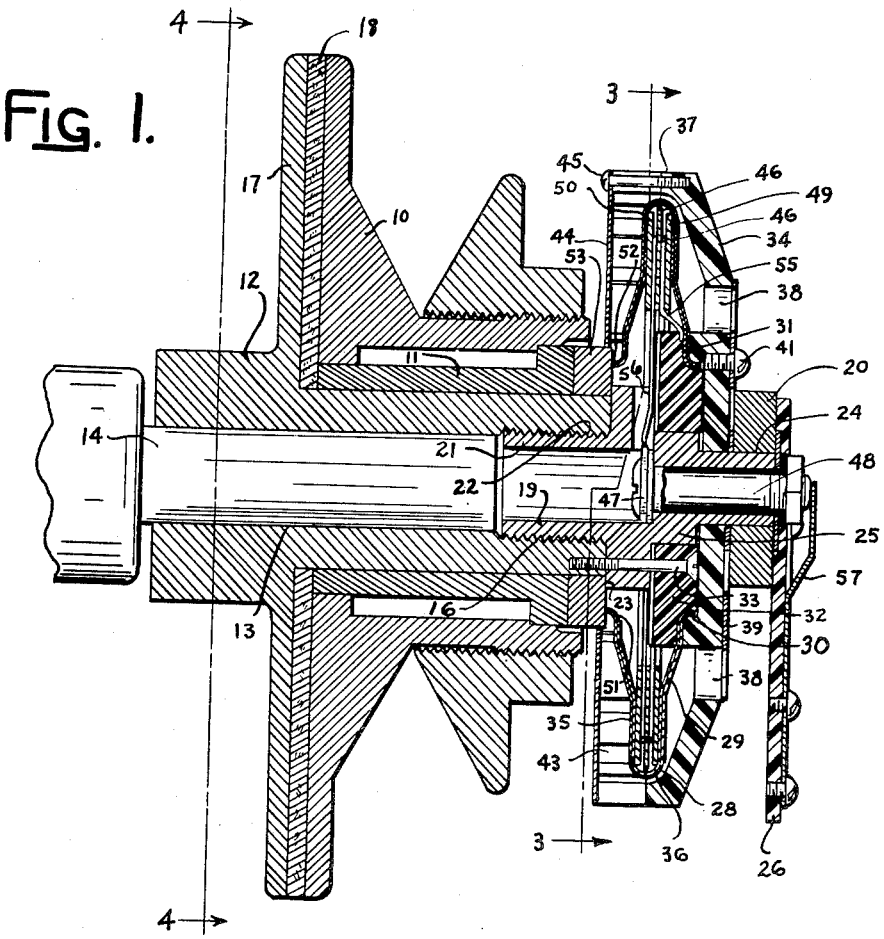
Fig. 1 is a central sectional view of a blower control made according to the invention.
Figure 2:
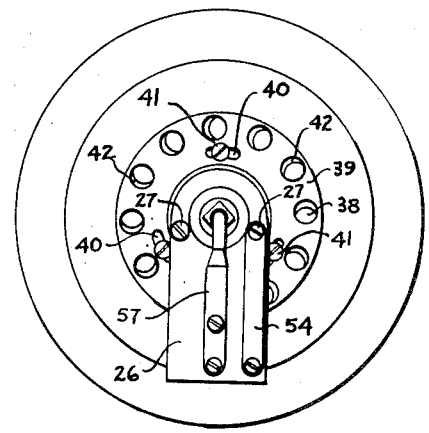
Fig. 2 is an end elevational view, on a reduced scale, of the blower control disclosed in Fig. 1, showing said blower control as it would appear from the right side in said Fig. 1.
Figure 3:
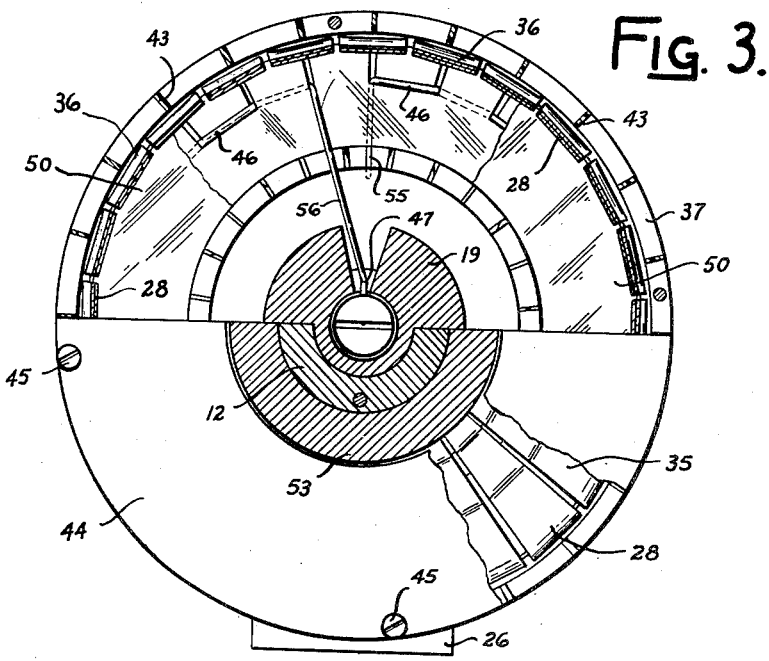
Fig. 3 is a detail sectional view, taken as on line 3—3 in Fig. 1.
Figure 4:
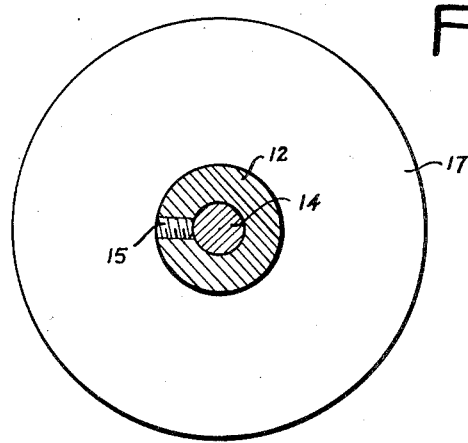
Fig. 4 is a detail sectional view, on a reduced scale, taken as on line 4—4 in Fig. 1.

The new and improved blower control is adapted to be employed to alterably control and regulate operation of a blower (not shown) of an air conditioning system in response to changes in temperature of a heat responsive element (also not shown) of said air conditioning system. Said blower ordinarily will be driven by an electric motor (not shown) of the air conditioning system through the medium of a belt (not shown) ridable upon a pulley fixed upon a driving shaft of said blower and also ridable upon an adjustable V-pulley 10 of the blower control which is rigid with a self-oiling bushing 11 revoluble and slidable upon a shaft 12 of said blower control to be driven by said electric motor.

The shaft 12 includes a central opening 13, which extends longitudinally through said shaft, in the inner end portion of which the electric motor shaft 14 is adapted to be rigidly secured, as by a set screw 15, and the shaft 12 also includes an internal thread 16 which bounds the outer end portion of said central opening 13.

Said shaft 12 driven by the electric motor integrally supports an annular element 17, situated at the inner side of the V-pulley 10, and an annular friction disc 18, in surrounding relation to the shaft 12, has a flat inner surface thereof arranged in contiguous relation to a flat outer surface of the annular element 17 disposed in a plane perpendicular to the axis of the shaft 12 and a flat outer surface thereof arranged in contiguous relation to a flat inner surface of the V-pulley 10 disposed in a plane perpendicular to said shaft 12. That is, the annular friction disc 18 is situated between the annular element 17 and the adjustable V-pulley 10. It may be fixed to either said annular element or to said V-pulley, but not to both.

A hollow fixture 19 is threadably received in the internal thread 16 of the shaft 12 driven by the electric motor, and said hollow fixture 19 is mounted in a fixedly supported bearing 20 situated in spaced relation to said electric motor. The hollow fixture 19 includes a reduced inner end portion 21 having an external thread 22 received in the internal thread 16 in such manner that an internal circumferential surface 23 of said hollow fixture is fitted up against the adjacent end of the shaft 12, and the hollow fixture includes a reduced outer end portion 24 rotatably mounted in the bearing 20. Said hollow fixture 19 also includes an intermediate portion 25 of cross-sectional dimension as shown about equal to the cross-sectional dimension of the reduced end portion 21. The hollow fixture 19 and the parts rigid therewith are adapted to be rotated in the bearing 20, and the construction and arrangement will be such that there will be no longitudinal movement of the hollow fixture relative to said bearing.

A block 26 of insulating material, situated at the outer side of the bearing 20, is fixed, as by screw bolts 27, to said bearing 20 up against a washer situated between the bearing and said block 26.

A plurality of separate and independent bi-metallic strips, each denoted 28 and of general U-shaped, are supported in spaced apart relation to each other upon and about the hollow fixture 19. Each of the bi-metallic strips 28 includes an outer arm 29 thereof which has its interior free end portion 30 engaged against an annular shoulder 31, provided by an insulating block 32 fixed, as by a screw bolt 33, upon the intermediate portion 25 of the hollow fixture 19, and situated between said annular shoulder 31 and an annular insulating member 34 fixed upon and perpendicular to the reduced outer end portion 24 of said hollow fixture. The construction and arrangement will be such that the interior free end portions 30 of the outer arms 29 of the bi-metallic strips 28 will be grasped and rigidly held between the annular shoulder 31 and the annular insulating member 34. Each bi-metallic strip 28 also includes an inner arm 35 thereof which is situated in spaced, alined relation to the outer arm 29, and the outer and inner arms 29 and 35 are integrally connected at the base 36 of each bi-metallic strip 28. Each base 36 is situated exteriorly of said outer and inner arms 29 and 35. An annular flange 37 upon the exterior margin of the annular insulating member 34 is as disclosed in spaced, overlying relation to the bases 36 of the bi-metallic strips 28.

Spaced apart openings 38 through the annular insulating member 34, in spaced, surrounding relation to the hollow fixture 19, are in adjacent relation to the outer arm 29 of the bi-metallic strip 28, and a closure plate 39 for said spaced apart openings 38 is adjustably supported upon the outer surface of said annular insulating member 34. The closure plate 39 includes spaced apart, elongated, arc shape slots 40 adapted to receive set screws 41 threaded into the annular insulating member 34, and said closure plate also includes spaced apart openings 42 adapted to be alined or partially alined with the spaced apart openings 38 in said annular insulating member. The construction and arrangement will be such that the closure plate 39 can be rotatably adjusted relative to the annular insulating member 34 thus to adjust and regulate the sizes of the passages for air, each constituted as an opening 38 and an opening 42, through said closure plate and annular insulating member. The annular flange 37 rigidly supports spaced apart, interiorly situated fan blades 43 which are in adjacent relation to the inner arms 35 of the bi-metallic strips 28, at the side of said bi-metallic strips opposite the spaced apart openings 38 and 42. An annular plate on the annular flange 37 at the inner sides of the fan blades 43, or side of said fan blades spaced from the annular insulating member 34, is denoted 44, and said annular flange 37 is open at locations between said fan blades 43 and exterior thereto. As disclosed, the annular plate 44 is secured to the annular flange 37 by screw bolts 45.

A resistance element 46, constituted as a resistance wire in mica, is suitably and conveniently supported, as at 47, upon the inner end of a contact screw 48 insulatively fixed within the hollow fixture 19 and is situated between the outer and inner arms 29 and 35 of the bi-metallic strips 28 in surrounding relation to said hollow fixture 19. Enamel-like, annular discs, denoted 49 and 50, respectively, lie between the resistance wire in mica and the outer and inner arms 29 and 35 of the bi-metallic strips 28, in spaced, surrounding relation to the hollow fixture. The annular discs 49 and 50 are adapted to electrically insulate the resistance wire from the bi-metallic strips and, at the same time, permit heat from said resistance wire to be absorbed by said bi-metallic strips. Stated otherwise, said annular discs 49 and 50 are electrical current resistors, but not heat resistors.

The inner arm 35 of each bi-metallic strip 28 includes an interior free end portion 51 which is bent inwardly toward and alined with the self-oiling bushing 11, and the interior free end portions 51 all lie in a single circumference which is concentric to the shaft 12 driven by the electric motor. The inner free ends 52 of said interior free end portions 51 all terminate in a single plane perpendicular to the axis of the shaft 12, and the bi-metallic strips 28 together constitute a thrust entity of the blower control.

A thrust ring 53, slidably situated upon an outer end portion of the shaft 12 driven by the electric motor between the interior free end portions 51 of the inner arms 35 of the bi-metallic strips 28 and the outer end of the self-oiling bushing 11, is retained upon said shaft 12 by the circumferential shoulder 23 provided by the hollow fixture 19 at the outer side of said thrust ring 53.

The resistance element 46 is adapted to be energized by electric energy thus to cause the outer and inner arms 29 and 35 of the bi-metallic strips 28, respectively, to become gradually spaced farther and farther apart and the V-pulley 10, the annular friction disc 18 and the annular element 17 to be clutched together. The construction and arrangement will be such that said bi-metallic strips will exert no appreciable pressure against the thrust ring 53 when said resistance element 46 is deenergized, so that the V-pulley 10, the annular element 17 and the annular friction disc 18 will be under insufficient pressure to cause rotation of said V-pulley 10 and the blower driving shaft to occur when the shaft 12 is set in operation in response to operation of the electric motor while the resistance element 46 is deenergized. In a practical embodiment of the invention, said resistance element 46 will become energized, in response to rise of temperature in the hood or plenum chamber of an air conditioning system in connection with which the blower control is employed, after the electric motor is set in operation. More explicitly stated, a heat responsive element of said air conditioning system is adapted to be actuated as the temperature rises in said hood or plenum chamber, while said electric motor is operating, to cause a circuit including the resistance element 46 to be closed thus to cause said resistance element to be energized. As the energized resistance element 46 causes the bi-metallic strips 28 to be heated up, the outer and inner arms 29 and 35 of the separate and independent bi-metallic strips 28, respectively, become gradually spaced apart by progressively increasing heat applied to said bi-metallic strips, and the thrust ring 53 becomes actuated inwardly, toward the left in Fig. 1, thus to cause the V-pulley 10 to be moved toward the annular friction disc 18 and the annular element 17. Stated otherwise, with increase in pressure exerted by the bi-metallic strips 28 against the thrust ring 53, the annular friction disc 18 is more tightly grasped between the V-pulley 10 and the annular element 17, and vice versa. As the friction between said V-pulley, annular friction disc and annular element becomes great enough to cause the V-pulley with the bushing 11 to be turned in response to rotation of the shaft 12 driven by the electric motor, said V-pulley, together with the hollow fixture 19 and parts rigid therewith, is rotated thus to cause the blower driving shaft, connected with the V-pulley 10 by a belt, to be rotated. Some slippage occurs between the annular friction disc 18 and the parts engaged with said annular friction disc throughout the entire range of blower speed up to the point where pressure exerted by the bi-metallic strips 28 causes said annular friction disc to be tightly grasped, and then the V-pulley 10 and the blower driving shaft are driven at the full speed of the electric motor driven shaft 12.

The heat responsive element of an air conditioning system in connection with which the blower control is employed can be constituted as a bi-metallic helix situated in the hood or plenum chamber of said air conditioning system and constructed and arranged to cause a circuit including the resistance element 46 to be closed in response to rise of temperature in said hood or plenum chamber. Said circuit can include as part thereof a terminal 54 suitably and conveniently supported upon the insulating block 26 and grounded to the bearing 20, a conductor 55 extending from one of the bi-metallic strips 28, which bi-metallic strip is grounded to the thrust ring 54, etc., to the resistance wire of the resistance element 46, a conductor 56 extending from said resistance wire to the contact screw 48, and a terminal 57 suitably and conveniently supported upon said insulating block 26 and conductively engaged with the outer end of said contact screw 48.

Closing the circuit including the resistance element 46, which circuit is traced from the terminal 54 to ground, thence from ground through the conductor 55, said resistance element 46, the conductor 56 and the contact screw 48 to the terminal 57, will cause said resistance element to be heated and the bi-metallic strips 28 to absorb heat. The arms of said bi-metallic strip will have tendency to move apart gradually and progressively when heated by the resistance element 46, and since the outer arms 29 of the bi-metallic strips are anchored, the inner arms 35 of said bi-metallic strips will be forced inwardly thus to cause the speed of rotation of the blower to be altered in the manner and with the result as hereinbefore set forth. It will be apparent that the heat responsive element of the air conditioning system can be set to cause the circuit including the resistance element 46 to be closed when the temperature of air in said hood or plenum chamber has any value which may be selected.

Attention is called to the fact that the layer of metal at the interior side of each bi-metallic strip 28 has a greater coefficient of expansion than the layer of metal at the exterior side of the bimetallic strip. Thus, the resistance element 46 applies its heat directly to the more expansible metal and the spreading action of the arms of the bi-metallic strip is positive and relatively quick.

It will be evident that the construction and arrangement can be such that the speed of rotation of the blower can be increased from zero speed to maximum speed, and decreased from maximum speed to zero speed, in any interval of time which may be selected. It is obvious that the time period will depend upon various factors surrounding the bi-metallic strip 28, the resistance element 46, etc., and the characteristics of the electrical energy employed. By way of example, an installation inherently can include provision for increase of speed of the blower employed from zero speed to maximum speed in three minutes, more or less.

The construction and arrangement including the spaced apart openings 38 and 42, the fan blades 43, etc., obviously constitutes means through the instrumentality of which increase of speed of rotation of the blower in any interval of time which may be predetermined can be accurately controllably accomplished. Desirably, the electric motor employed can be a substantially constant speed motor. The motor driven shaft 12 and the parts rigid with said motor driven shaft, including a force unit consisting of the bi-metallic strips 28, the resistance element 46, the hollow fixture 19, the insulating block 32, the annular insulating member 34 and its fan blades 43, etc., are assembled with the electric motor shaft 14 to be continuously rotated at the speed of said motor shaft at all times while the electric motor is in operation. The construction and arrangement will be such that air will be drawn or sucked by the fan blades 43 through the spaced apart openings 38 and 42 over the bi-metallic strips 28 and radially out of the unit constituting the blower control at the side of said bi-metallic strips 28 opposite said spaced apart openings 38 and 42. It will be evident that by adjustment of the closure plate 39 thus to adjust and regulate the sizes of the passages for air through said closure plate and the annular insulating member 34, by way of the spaced apart openings 38 and 42, the temperature within the blower control in surrounding relation to the bi-metallic strips 28 can be kept at any substantially constant value which may be selected. The smaller the sizes of the passages for air, the higher the temperature constantly maintained at the location of and about the bi-metallic strips, and the larger the sizes of said passages for air, the lower the overall temperature at and about said bi-metallic strips.

Upon the fall of temperature in the hood or plenum chamber of an air conditioning system in connection with which the new and improved blower control is employed to a temperature causing the heat responsive element to open the circuit including the resistance element 46, said resistance element of course will become deenergized and lose heat thus to cause the bimetallic strips 28 to become contracted and release the annular friction disc 18 to permit the blower to come to rest.

No matter what may be the actual temperature in the hood or plenum chamber, or whether the heating plant or furnace is heating up or cooling off, operation of the blower will be in response to temperature of air in said hood or plenum chamber. The velocity and volume of air forced to and through the hood of plenum chamber will be progressively and accurately controlled and regulated through a selected range of values, predetermined by the construction and arrangement of the bi-metallic strips 28, the resistance element 46, etc., etc., and the electrical energy employed, by adjustment of the multiple speed drive in response to the temperature in the hood or plenum cham-

What is claimed is:

1. In a device of the character described, a shaft to be driven, an element longitudinally slidable and freely rotatable on said shaft, a variable speed drive including frictionally engaged members upon the shaft for connecting said shaft to said element and mechanism fixed to said shaft to rotate therewith adapted to be thermostatically expanded to cause said variable speed drive to rotate said element at higher speeds and to be thermostatically contracted to cause the variable speed drive to rotate said element at lower speeds, and electrical resistance means upon said shaft and fixed to rotate with said mechanism for causing the mechanism to be heated.

2. The combination as specified in claim 1, and manually adjustable means upon said shaft and fixed to rotate with said mechanism and electrical resistance means for causing the rate of friction of said variable speed drive due to temperature changes of said mechanism selectively to be varied.

3. The combination as specified in claim 1, and means including fan blades and manually adjustable air passages upon said shaft and fixed to rotate with said mechanism and electrical resistance means for causing air in predetermined amount constantly to travel past said mechanism and electrical resistance means.

4. In a machine of the character described, a shaft to be driven including a first clutching surface, an element freely rotatable on said shaft including a second clutching surface, and mechanism fixed upon said shaft constituted as resistance heating means and temperature responsive means adapted to be expanded in response to rise of temperature to operate said second clutching surface toward said first clutching surface to cause said element to be rotated at higher speeds and to be contracted in response to fall of temperature to permit the second clutching surface to be moved away from the first clutching surface to cause the element to be rotated at lower speeds, and manually adjustable means fixed upon said shaft to rotate therewith and with said mechanism for causing air in predetermined amount constantly to travel past said resistance heating means and said temperature responsive means.

5. In a device of the character described, a shaft to be driven, an element longitudinally slidable and freely rotatable on said shaft, a variable speed drive including frictionally engaged members for connecting said shaft to said element, heat responsive mechanism including an expansible and contractible member rotatable with said shaft and operable to alter the friction of said drive thus to alter the speed of rotation of said element in response to changes in temperature of said heat responsive mechanism, and manually adjustable means fixed upon said shaft to rotate therewith for causing the rate of alteration of the friction of said drive due to temperature changes of said expansible and contractible member selectively to be varied.

6. In a device of the character described, a shaft to be driven, an element freely rotatable on said shaft, a variable speed drive including frictionally engaged members for connecting said shaft to said element, heat responsive mechanism including an expansible and contractible member rotatable with said shaft and operable to alter the friction of said drive thus to alter the speed of rotation of said element in response to changes in temperature of said heat responsive mechanism, and manually adjustable means fixed upon said shaft to rotate therewith and with said heat responsive mechanism for causing the rate of alteration of the friction of said drive due to temperature changes of said expansible and contractible member selectively to be varied.

7. In a machine of the character described, a shaft to be driven including a first clutching surface, an element freely rotatable on said shaft including a second clutching surface, and mechanism fixed upon said shaft at the side of said second clutching surface opposite said first clutching surface constituted as resistance heating means and bi-metallic strips disposed in surrounding relation to and each bent to loop form about said resistance heating means adapted to be expanded in response to rise of temperature to operate said second clutching surface toward said first clutching surface to cause said element to be rotated at higher speeds and to be contracted in response to fall of temperature to permit the second clutching surface to be moved away from the first clutching surface to cause the element to be rotated at lower speeds, each of said bi-metallic strips including a first arm at a side of the resistance heating means adjacent the first and second clutching surfaces and a second arm anchored to said shaft at a side of said resistance heating means opposite said first and second clutching surfaces.

8. The combination as specified in claim 7, and adjustable means rotatable with said mechanism for causing air in predetermined amount constantly to travel past said resistance heating means and said bi-metallic strips.

9. The combination as specified in claim 7, and means including fan blades and manually adjustable air passages rotatable with said shaft and said mechanism for causing air in predetermined amount constantly to travel past said resistance heating means and said bi-metallic strips.

References Cited in the file of this patent

UNITED STATES PATENTS

| Number | Name | Date |
|---|---|---|
| 2,005,465 | Modine | June 18, 1935 |
| 2,021,413 | Gille | Nov. 19, 1935 |
| 2,090,401 | Mayo | Aug. 17, 1937 |
| 2,308,507 | Hallinan | Jan. 19, 1943 |
| 2,320,900 | Waltz | June 1, 1943 |
| 2,322,405 | White | June 22, 1943 |
| 2,369,681 | Miles | Feb. 20, 1945 |
| 2,471,924 | Bolesky | May 31, 1949 |
| 2,498,259 | Elmer | Feb. 21, 1950 |
| 2,502,461 | Kane | Apr. 4, 1950 |